(12) United States Patent
Miyazaki et al.

(10) Patent No.: US 8,146,725 B2
(45) Date of Patent: Apr. 3, 2012

(54) FRICTION PLATE AND WET-TYPE MULTI-PLATE CLUTCH HAVING SUCH FRICTION PLATE

(75) Inventors: Tomoyuki Miyazaki, Fukuroi (JP); Masahiro Kobayashi, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 553 days.

(21) Appl. No.: 11/641,020

(22) Filed: Dec. 19, 2006

(65) Prior Publication Data

US 2007/0199794 A1 Aug. 30, 2007

(30) Foreign Application Priority Data

Dec. 20, 2005 (JP) .................... 2005-366871

(51) Int. Cl.
*F16D 13/72* (2006.01)
*F16D 13/00* (2006.01)
(52) U.S. Cl. ................. 192/70.12; 192/113.36
(58) Field of Classification Search ............... 192/70.12, 192/113.36
See application file for complete search history.

(56) References Cited

U.S. PATENT DOCUMENTS

| | | | |
|---|---|---|---|
| 2,690,248 A | 9/1954 | Mcdowall | |
| 3,048,250 A | 8/1962 | Kershner | |
| 4,027,758 A | 6/1977 | Gustavsson et al. | |
| 4,287,978 A | 9/1981 | Staub, Jr. | |
| 4,674,616 A * | 6/1987 | Mannino, Jr. | 192/107 R |
| 4,726,455 A | 2/1988 | East | |
| 5,094,331 A | 3/1992 | Fujimoto et al. | |
| 5,335,765 A * | 8/1994 | Takakura et al. | 192/107 R |
| 5,776,288 A | 7/1998 | Stefanutti et al. | |
| 5,954,172 A * | 9/1999 | Mori | 192/3.29 |
| 5,975,260 A | 11/1999 | Fischer et al. | |
| 6,035,991 A | 3/2000 | Willwerth et al. | |
| 6,062,367 A | 5/2000 | Hirayanagi et al. | |
| 6,145,645 A | 11/2000 | Kroll et al. | |
| 6,203,649 B1 * | 3/2001 | Kremsmair et al. | 156/211 |
| 6,712,190 B2 | 3/2004 | Kitaori et al. | |
| 6,776,272 B2 * | 8/2004 | Granderath | 192/3.29 |
| 6,851,532 B2 * | 2/2005 | Back et al. | 192/3.3 |
| 7,000,747 B2 * | 2/2006 | Back et al. | 192/3.3 |
| 7,073,650 B2 * | 7/2006 | Fabricius et al. | 192/113.36 |
| 7,172,062 B2 | 2/2007 | Kitahara et al. | |
| 7,789,209 B2 | 9/2010 | Miyazaki et al. | |

(Continued)

FOREIGN PATENT DOCUMENTS

JP 62-098832 U 6/1987

(Continued)

*Primary Examiner* — Roger Pang
(74) *Attorney, Agent, or Firm* — Miles & Stockbridge P.C.

(57) ABSTRACT

The present invention provides a friction plate having a friction surface formed by sticking an annular friction material to a substantially annular core plate and wherein the friction surface is provided with a first oil groove having an opening portion opened to an inner peripheral edge of the friction plate and an end terminating at a point between the inner peripheral edge and an outer peripheral edge, and a second oil groove having an opening portion opened to the outer peripheral edge of the friction plate and an end terminating at a point between the inner peripheral edge.

22 Claims, 2 Drawing Sheets

U.S. PATENT DOCUMENTS

| | | |
|---|---|---|
| 2005/0011720 A1 | 1/2005 | Adair et al. |
| 2005/0072649 A1 | 4/2005 | Guthrie et al. |
| 2005/0109576 A1 | 5/2005 | Kitahara et al. |
| 2005/0224310 A1 | 10/2005 | Li et al. |
| 2007/0017773 A1 | 1/2007 | Suzuki et al. |
| 2007/0102258 A1* | 5/2007 | Miyazaki et al. ........ 192/113.36 |
| 2008/0156611 A1 | 7/2008 | Hirayanagi |
| 2008/0173516 A1 | 7/2008 | Hirayanagi |
| 2008/0179161 A1 | 7/2008 | Kobayashi et al. |
| 2008/0302625 A1 | 12/2008 | Takayanagi |

FOREIGN PATENT DOCUMENTS

| | | |
|---|---|---|
| JP | 62-112324 U | 7/1987 |
| JP | 04-211729 A | 8/1992 |
| JP | 11-141570 A | 5/1999 |
| JP | 2002-181073 | 6/2002 |
| JP | 2005-036980 A | 2/2005 |
| JP | 2005-076759 A | 3/2005 |
| WO | 2008/148461 | 12/2008 |

* cited by examiner

FRICTION PLATE AND WET-TYPE MULTI-PLATE CLUTCH HAVING SUCH FRICTION PLATE

BACKGROUND OF THE INVENTION

1. Field of the Invention

The present invention relates to a friction plate used in a clutch and/or a brake of an automatic transmission (AT) of a vehicle and a wet-type multi-plate clutch having such a friction plate. More specifically, the present invention relates to an improvement in an oil passage formed in a friction surface of a friction plate.

2. Description of the Related Art

In general, in a wet-type multi-plate clutch, friction plates and separator plates are arranged alternately between a drum and a hub of a clutch or a brake, and, engagement and disengagement of the clutch are performed by pressurizing and releasing a clutch piston.

Further, recently, request for reducing fuel consumption in a vehicle has been increased more and more, and thus, also in an automatic transmission, in order to reduce power loss during the disengagement of the clutch, further reduction of drag torque between the friction plate and the separator plate has been requested.

In general, in many cases, the wet-type multi-plate clutch used in the automatic transmission (AT) is designed so that lubricating oil can easily escape from an inner peripheral side to an outer peripheral side of the friction plate in order to reduce the power loss, thereby reducing the drag torque. Such means for reducing the drag torque are already known and are disclosed, for example, in Japanese Patent Application Laid-Open Nos. H11-141570 and 2005-76759. In clutches disclosed in the Japanese Patent Application Laid-Open Nos. H11-141570 and 2005-76759, a friction plate is provided with an oil groove having an closed end at an inner peripheral side and serving to separate friction plates and separator plates during the disengagement of the clutch, and an oil supplying oil passage extending through from an inner radial end to an outer radial end and serving to prevent seizure by supplying lubricating oil onto friction surfaces during the engagement of the clutch.

However, recently, in order to enhance response of the transmission for the purpose of achieving not only enhanced reduction of fuel consumption but also enhancement of power performance, a clearance between the friction plate and the separator plate has been made smaller than that those in the conventional clutches, with the result that, during an idle rotation, drag torque caused by an oil film existing between the friction plate and the separator plate tends to be increased.

The oil supplied to the oil passage extending through from the inner diameter side to the outer diameter side is drawn into the friction material by the rotation, and, if the drawn oil enters between the friction plate and the separator plate, the oil is hard to be discharged. Particularly, in the case where the clearance between the friction plate and the separator plate is small, the difficulty of discharging of the oil becomes noticeable in an area where revolution per minute is small, thereby increasing the drag torque due to viscosity between the friction material and the opposing separator plate.

Although the oil passage provided to extend through between the inner diameter side and the outer diameter side serves to supply the oil to the friction surface and to discharge the oil, the configuration of the oil groove and/or both dull corners of the oil groove affect a great influence upon the flow of the oil from the oil groove to the friction surface, with the result that the idle rotation torque may be increased.

In the conventional friction plates, since the oil could not discharge adequately from the friction surface, the request for further reducing the drag torque could not be satisfied. Particularly, in the low rotational speed area, the drag torque could not be reduced.

However, in order to meet the requirements regarding compactness and light-weight sought by recent automatic transmissions, it is desired that a friction capacity of each friction plate be increased. To this end, increase in the number of grooves and dimension of the groove has been controlled severely.

SUMMARY OF THE INVENTION

Accordingly, an object of the present invention is to provide a friction plate in which drag torque during an idle rotation is small and there is no dispersion in a friction property upon engagement thereby to stabilize a quality and shock upon the engagement is small and which has excellent heat-resistance and can reduce the drag torque during the idle rotation considerably in comparison with conventional friction plates, and a wet-type multi-plate clutch having such a friction plate.

To achieve the above object, the present invention provides a friction plate having a friction surface formed by sticking an annular friction material to a substantially annular core plate and wherein the friction surface is provided with a first oil groove having an opening portion opened to an inner peripheral edge of the friction plate and an end terminating at a point between the inner peripheral edge and an outer peripheral edge, and a second oil groove having an opening portion opened to the outer peripheral edge of the friction plate and an end terminating at a point between the inner peripheral edge and the outer peripheral edge.

Further, the present invention provides a friction plate having a friction surface formed by sticking a plurality of friction material segments to a substantially annular core plate without no gap therebetween and wherein the friction surface is provided with a first oil groove having an opening portion opened to an inner peripheral edge of the friction plate and an end terminating at a point between the inner peripheral edge and an outer peripheral edge, and a second oil groove having an opening portion opened to the outer peripheral edge of the friction plate and an end terminating at a point between the inner peripheral edge and the outer peripheral edge, and wherein each of the friction material segments has the first oil groove and the second oil groove.

According to the present invention, the following effects can be obtained.

Since the friction plate is provided with the first oil groove opened to the inner peripheral edge and having the closed end portion and the second oil groove opened to the outer peripheral edge and having the closed end portion, the first oil groove can separate the corresponding separator plate from the friction plate during the idle rotation, thereby enhancing a cushioning ability upon the engagement. Further, since the supplying of the oil which cools the friction heat generated upon the engagement and the disengagement is promoted, the heat generated in the friction plate can be cooled effectively. Particularly, the oil can also serve to provide a cushioning function for preventing quick seizure of the clutch in the initial stage of the engagement.

Further, since the second oil groove opened only to the outer peripheral edge serves to discharge the oil from the friction surface exclusively, reduction of the drag during the idle rotation and the friction property upon the engagement can be improved, thereby providing a stable clutch having less dispersion. Particularly, during the low speed rotation, the drag torque can be reduced effectively. Thus, in accordance with use conditions regarding the supplying amount of the oil and the revolution per minute and the like, an optimum combination of the first and second oil grooves can be designed, thereby providing a wet-type multi-plate clutch having stable quality. Further, since the drawn oil can be discharged smoothly, the heat generated upon the engagement can also be discharged smoothly together with the oil, thereby enhancing the heat-resistance of the friction material.

It is possible to achieve various designs on the basis of the supplying amount of the oil and the rotating condition used. Similarly, regarding the oil groove opened to the inner peripheral edge, when the width of the oil groove at the inner diameter side is increased, the separating effect for separating the friction material is further enhanced. Incidentally, if both of the first and second oil grooves are inclined with respect to the radial direction, the separating effect for separating the friction surface and the oil discharging ability can be further enhanced.

Further features of the present invention will become apparent from the following description of exemplary embodiments with reference to the attached drawings.

DESCRIPTION OF THE EMBODIMENTS

Figure 1:
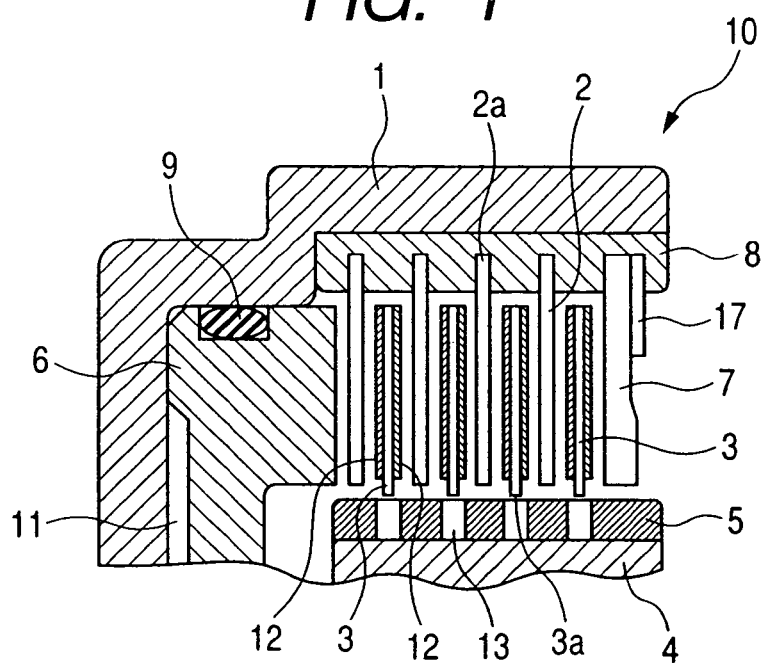
FIG. 1 is a partial axial sectional view of a wet-type multi-plate clutch 10 having friction plates of the present invention.

Now, the present invention will be fully explained with reference to the accompanying drawings. Incidentally, in the drawings, the same parts or elements are designated by the same reference numerals.

FIG. 1 is a partial axial sectional view of a wet-type multi-plate clutch 10 having a friction plate according to the present invention.

The wet-type multi-plate clutch 10 comprises a substantially cylindrical drum or clutch case 1 having an axially opened one end, a hub 4 disposed within the interior of the clutch case 1 and arranged coaxially with the clutch case and rotated relative to the clutch case, a plurality of annular separator plates 2 disposed in a spline member 8 provided on an inner periphery of the clutch case 1 for a shifting movement in an axial direction, and a plurality of annular friction plates 3 disposed in a spline member 5 provided on an outer periphery of the hub 4 and arranged alternately with the separator plates 2 in the axial direction and each having friction materials adhered or stuck to surfaces thereof.

The wet-type multi-plate clutch 10 further comprises a piston 6 for urging the separator plates 2 and the friction plates 3 to engage them together, a packing plate 7 provided in the inner periphery of the clutch case 1 and adapted to hold the separator plates 2 and the friction plates 3 in a fixed condition at axial one end, and a stop ring 17 for fixedly holding the packing plate.

As shown in FIG. 1, the piston 6 is disposed within a closed end portion of the clutch case 1 for a sliding movement in the axial direction. An O-ring 9 is arranged between an outer peripheral surface of the piston 6 and an inner surface of the clutch case 1. Further, a seal member (not shown) is also arranged between an inner peripheral surface of the piston 6 and an outer peripheral surface of a cylindrical portion (not shown) of the clutch case 1. Accordingly, an oil-tight hydraulic chamber 11 is defined between an inner surface of the closed end of the clutch case 1 and the piston 6.

Each of the friction plates 3 held by the hub 4 for a sliding movement in the axial direction is provided at its both surfaces with friction materials 12 secured thereto and each having a predetermined coefficient of friction. However, the friction material 12 may be provided on only one surface of the friction plate 3 and the separator plate 2. Further, lubricating oil supplying ports 13 for supplying lubricating oil from an inner diameter side to an outer diameter side of the wet-type multi-plate clutch 10 are formed in the hub 4 to extend or pass through the hub in a radial direction.

The wet-type multi-plate clutch 10 having the above-mentioned arrangement is tightened (engaged) and released (disengaged) in the following manner. FIG. 1 shows a clutch disengaged or released condition. In this condition, the separator plates 2 and the friction plates 3 are separated from each other. In the released condition, by a biasing force of a return spring (not shown), the piston 6 abuts against the inner surface of the closed end of the clutch case 1.

From this condition, in order to tighten or engage the clutch, oil pressure is supplied into the hydraulic chamber 11 defined between the piston 6 and the clutch case 1. As the oil pressure is increased, the piston 6 is shifted to the right (FIG. 1) in the axial direction in opposition to the biasing force of the return spring (not shown), thereby closely contacting the separator plates 2 with the friction plates 3. In this way, the clutch is tightened or engaged.

After the engagement, in order to release or disengage the clutch again, the oil pressure in the hydraulic chamber 11 is released. When the oil pressure is released, by the biasing force of the return spring (not shown), the piston 6 is shifted to a position where the piston abuts against the closed end of the clutch case 1. In this way, the clutch is released or disengaged.

First Embodiment

Figure 2:
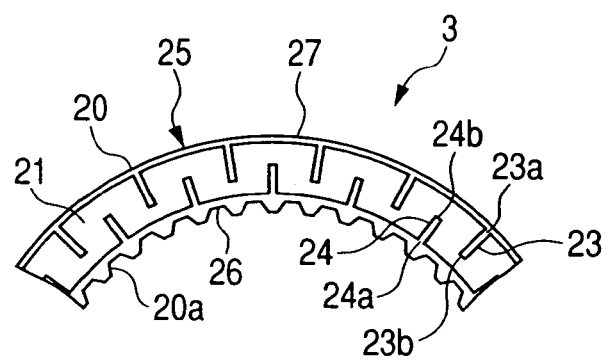
FIG. 2 is a partial front view of the friction plate according to a first embodiment of the present invention.

FIG. 2 is a partial front view of a friction plate 3, showing a first embodiment of the present invention. The friction plate 3 has a friction surface 25 formed by sticking or adhering an annular friction material 21 to a substantially annular core plate 20. The core plate 20 is provided at its inner periphery with splines 20a engaged by the splines 5 of the hub 4.

As shown, the annular friction material 21 is provided with first oil grooves 24 each having an opening portion 24a opened to an inner peripheral edge 26 of the friction plate 3 and an end portion 24b terminating at a point between the inner peripheral edge and an outer peripheral edge, and second oil grooves 23 each having an opening portion 23a opened to the outer peripheral edge 27 of the friction plate 3 and an end portion 23b terminating at a point between the inner and outer peripheral edges. The first oil grooves 24 and the second oil grooves 23 are alternately arranged along a circumferential direction substantially equidistantly.

The second oil grooves opened to the outer peripheral edge 27 are provided in the friction surface 25. Accordingly, the lubricating oil for lubricating the friction engagement surface, which is drawn onto the friction surface 25 is discharged smoothly toward the outer diameter side by the second oil grooves 23, with the result that the drag torque can be reduced during the idle rotation.

All of the first oil grooves 24 and second oil grooves 23 have substantially the same circumferential widths extending from the opening portion to the end portion.

Second Embodiment

Figure 3:
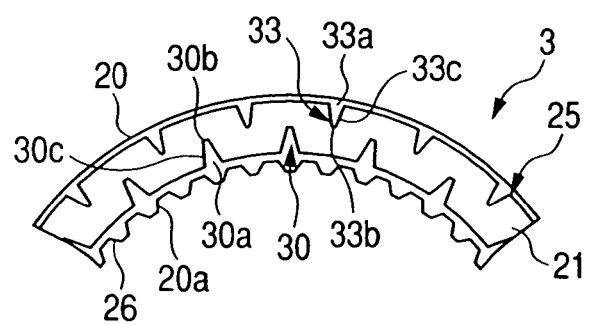
FIG. 3 is a partial front view of the friction plate according to a second embodiment of the present invention.

FIG. 3 is a partial front view of the friction plate 3, showing a second embodiment of the present invention. A fundamental construction of the second embodiment is the same as that of the first embodiment. Accordingly, only differences will be described. This is also true with respect to third, fourth and fifth embodiments which will be described later.

In the second embodiment, each of first oil grooves 30 each having an opening portion 30a opened to the inner peripheral edge 26 of the friction plate 3 and an end portion 30b terminating at a point between the inner and outer peripheral edges and each of second oil grooves 33 each having an opening portion opened to the outer peripheral edge 27 and an end portion terminating at a point between the inner and outer peripheral edges has a tapered configuration.

As shown, each first oil groove 30 has tapered portions 30c extending from both circumferential ends of the opening portion 30a to the end portion 30b. Accordingly, the first oil groove 30 has a tapered configuration having a circumferential width gradually increasing from the end portion 30b to the opening portion 30a.

Further, similarly, each of the second oil grooves 33 has tapered portions 33c extending from both circumferential ends of the opening portion 33a to the end portion 33b. Accordingly, the second oil groove 33 has a tapered configuration having a circumferential width gradually increasing from the end portion 33b to the opening portion 33a.

Similar to the first embodiment, the first oil grooves 30 and the second oil grooves 33 are alternately arranged along a circumferential direction substantially equidistantly.

Third Embodiment

Figure 4:
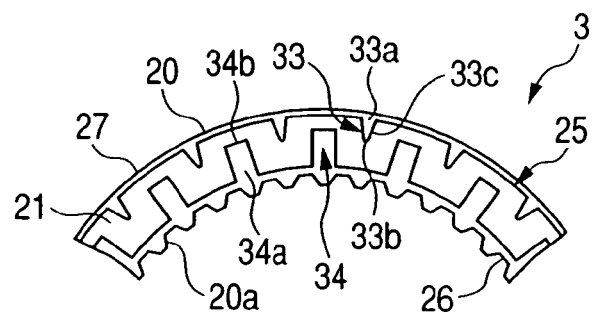
FIG. 4 is a partial front view of the friction plate according to a third embodiment of the present invention.

FIG. 4 is a partial front view of a friction plate 3, showing a third embodiment of the present invention. A fundamental construction of the third embodiment is the same as that of the second embodiment. Accordingly, only a difference will be described.

The third embodiment is an alteration of the second embodiment. In this third embodiment, a configuration of a first oil groove differs from that of the second embodiment. A first oil groove 34 has generally a rectangular configuration and includes an opening portion 34a opened to the inner peripheral edge 26 of the friction plate 3 and an end portion 34b terminating at a point between the inner and outer peripheral edges, and a circumferential width of the opening portion 34a is substantially the same as that of the end portion 34b. Further, similar to the first embodiment, the first oil grooves 34 and the second oil grooves 33 are alternately arranged along a circumferential direction substantially equidistantly.

Fourth Embodiment

Figure 5:
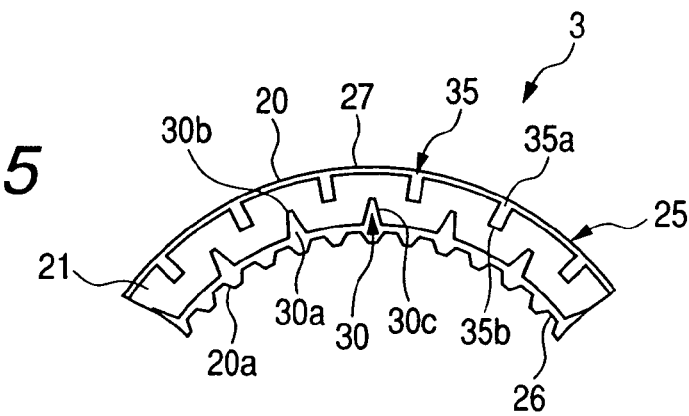
FIG. 5 is a partial front view of the friction plate according to a fourth embodiment of the present invention.

FIG. 5 is a partial front view of a friction plate 3, showing a fourth embodiment of the present invention. In the fourth embodiment, a configuration of the second oil groove of the second embodiment is changed so that an arrangement reverse to that of the third embodiment is obtained. However, a second oil groove 35 of the fourth embodiment has a rectangular configuration smaller than that of the first oil groove 34 of the third embodiment.

The second oil groove 35 has generally a rectangular configuration and includes an opening portion 35a opened to the outer peripheral edge 27 of the friction plate 3 and an end portion 35b terminating at a point between the inner and outer peripheral edges, and a circumferential width of the opening portion 35a is substantially the same as that of the end portion 35b. Further, similar to the first to third embodiments, the first oil grooves 30 and the second oil grooves 35 are alternately arranged along a circumferential direction substantially equidistantly.

Fifth Embodiment

Figure 6:
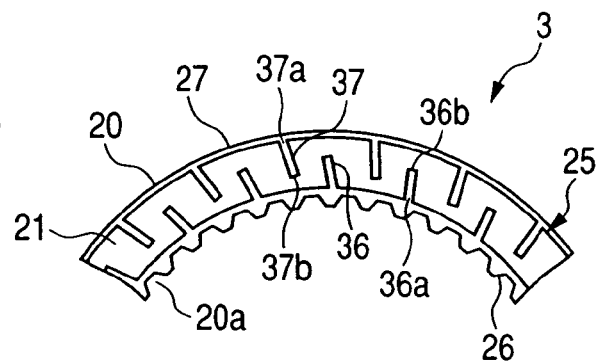
FIG. 6 is a partial front view of the friction plate according to a fifth embodiment of the present invention.

FIG. 6 is a partial front view of a friction plate 3, showing a fifth embodiment of the present invention. A fundamental construction of the fifth embodiment is the same as that of the first embodiment. Accordingly, only differences will be described.

In the fifth embodiment, first and second oil grooves are inclined at a predetermined angle in the circumferential direction. A friction material 21 is provided with first oil grooves 36 each having an opening portion 36a opened to the inner peripheral edge 26 of the friction plate 3 and an end portion 36b terminating at a point between the inner and outer peripheral edges, and second oil grooves 37 each having an opening portion 37a opened to the outer peripheral edge 27 of the friction plate and an end portion 37b terminating at a point between the inner and outer peripheral edges. The first oil grooves 36 and the second oil grooves 37 are alternately arranged along a circumferential direction substantially equidistantly.

As can be seen from FIG. 6, the first oil grooves 36 and the second oil grooves 37 are inclined at the predetermined angle in the circumferential direction. In this example, although an inclined angle of the first oil groove 36 is the same as an inclined angle of the second oil groove 37, these angles may be differentiated. In FIG. 6, while an example that each of the first oil grooves 36 and each of the second oil grooves 37 has the circumferential width from the opening portion to the end portion was illustrated, such width(s) mat be differentiated.

Figure 7:
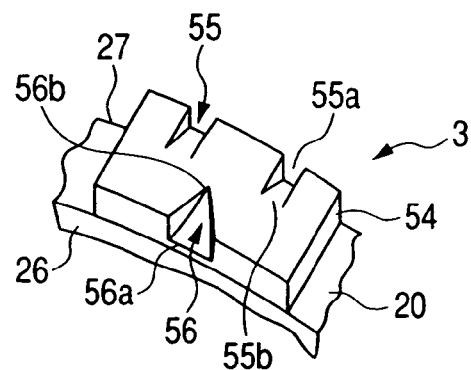
FIG. 7 is a partial perspective view of a friction plate, showing an alteration of an oil groove applicable to various embodiments of the present invention.

FIG. 7 is a partial perspective view of a friction plate, showing an alteration of oil grooves, which can be applied to various embodiments of the present invention. A friction material segment 54 is provided with a first oil groove 56 having an opening portion 56a opened to the inner peripheral edge 26 of the friction plate 3 and an end portion 56b terminating at a point between the inner and outer peripheral edges, and second oil grooves 55 each having an opening portion 55a opened to the outer peripheral edge 27 of the friction plate 3 and an end portion 55b terminating at a point between the inner and outer peripheral edges. A single first oil groove 56 is provided and two second oil grooves 55 are arranged on both sides of the first oil groove 56 in a circumferential direction.

Here, the first oil groove 56 has a tapered configuration inclined toward a direction spaced apart from a surface of a core plate 20 from the opening portion 56a to the end portion 56b. That is to say, an axial depth of the first oil groove is smallest at the end portion 56b. Further, at the end portion 56b, a circumferential width is smallest.

Further, similarly, each of the second oil grooves 55 has a tapered configuration inclines toward a direction spaced apart from the surface of the core plate 20 from the opening portion 55a to the end portion 55b. That is to say, an axial depth of the second oil groove is smallest at the end portion 55b.

In the above-mentioned various embodiments, while an example that the friction plate is formed by securing the single annular friction material to the core plate was explained, a friction plate may be formed by arranging a plurality of friction material segments without any gap therebetween in an annular shape and by securing them to the core plate.

Although the first and second oil grooves can be formed by providing notches in the friction material, such oil grooves may be formed by a pressing technique.

Although the friction material 21 and the friction material segments are stuck to the core plate 20 by an adhesive, a seal-like friction material 21 or friction material segments having a rear surface on which an adhesive is applied may be rested on the core plate 20 and then may be stuck to the core plate by pressure and heat.

Further, in the above-mentioned embodiments, a tip end of each first oil groove extending from the inner peripheral edge 26 and a tip end of each second oil groove extending from the outer peripheral edge 27 extend beyond the center in the radial direction. However, the length of each oil groove is optional, and thus, it should be noted that the length of each oil groove may be longer or shorter than those shown in the various embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-366871, filed Dec. 20, 2005, which is hereby incorporated by reference herein in its entirety.

What is claimed is:

1. A wet-type multi-plate clutch comprising:
   a clutch case;
   a hub arranged coaxially with the clutch case and in an interior of the clutch case, the hub including at least one lubricating oil supply port for supplying oil from an inner diameter side toward an outer diameter side of the clutch;
   a plurality of annular separator plates engaged with a spline member on one of an inner periphery of the clutch case and an outer periphery of the hub;
   a plurality of annular friction plates engaged with a spline member on the other of the inner periphery of the clutch case and the outer periphery of the hub, the friction plates being arranged alternately with the separator plates; and
   a piston that urges the friction plates and the separator plates into contact with each other so as to engage the clutch,
   wherein each of the friction plates has a friction surface formed by attaching a unitary, annular friction material to a first surface of a substantially annular core plate,
   said friction surface includes a plurality of first oil grooves and a plurality of second oil grooves formed in said annular friction material,
   each first oil groove has an opening portion opened at an inner peripheral edge of said friction material and an end portion terminating at a point between the inner peripheral edge and an outer peripheral edge of said friction material,
   each second oil groove has an opening portion opened at the outer peripheral edge of said friction material and an end portion terminating at a point between the inner peripheral edge and the outer peripheral edge of said friction material,
   said first oil grooves and said second oil grooves are alternately arranged in a circumferential direction equidistantly,
   a circumferential width of each first oil groove is the same from the inner peripheral edge of said friction material to the corresponding end portion,
   wherein the first oil grooves act to separate the respective friction plate from an adjacent separator plate during idle rotation, and
   the second oil grooves act to discharge oil drawn onto the friction surface during idle rotation toward an outer diameter side of the respective friction plate.

2. A wet-type multi-plate clutch according to claim 1, wherein each second oil groove has a width decreasing from said opening portion to said end portion.

3. A wet-type multi-plate clutch according to claim 1, wherein at least one of said first oil grooves and said second oil grooves is inclined in a circumferential direction.

4. A wet-type multi-plate clutch according to claim 1, wherein each first oil groove has an axial depth increasing from said end portion to said opening portion.

5. A wet-type multi-plate clutch according to claim 1, wherein each second oil groove has an axial depth increasing from said end portion to said opening portion.

6. A wet-type multi-plate clutch according to claim 1, wherein each of said first oil grooves and said second oil grooves has an axial depth increasing from said end portion to said opening portion.

7. A wet-type multi-plate clutch according to claim 1, wherein a radial length of each first oil groove is substantially the same as a radial length of each second oil groove.

8. A wet-type multi-plate clutch according to claim 1, wherein a radial length of each first oil groove differs from a radial length of each second oil groove.

9. A wet-type multi-plate clutch according to claim 1, wherein the circumferential width of each first oil groove is greater than a circumferential width of each second oil groove.

10. A wet-type multi-plate clutch according to claim 1, wherein a circumferential width of each second oil groove is the same from the outer peripheral edge of said friction material to the corresponding end portion.

11. A wet-type multi-plate clutch according to claim 10, wherein the circumferential width of each first oil groove is the same as the circumferential width of each second oil groove.

12. A wet-type multi-plate clutch according to claim 1, wherein each second oil groove is arranged in the circumferential direction midway between an adjacent pair of the first oil grooves.

13. A wet-type multi-plate clutch according to claim 1, wherein the hub includes a plurality of oil supply ports, each disposed substantially radially inward from a corresponding one of said friction plates.

14. A wet-type multi-plate clutch according to claim 1, wherein each friction plate has a further friction surface formed by attaching another of said annular friction material to a second surface of the core plate on an opposite side of the core plate from the first surface.

15. A wet-type multi-plate clutch comprising:
a clutch case;
a hub arranged coaxially with the clutch case and in an interior of the clutch case, the hub including at least one lubricating oil supply port for supplying oil from an inner diameter side toward an outer diameter side of the clutch;
a plurality of annular separator plates engaged with a spline member on one of an inner periphery of the clutch case and an outer periphery of the hub;
a plurality of annular friction plates engaged with a spline member on the other of the inner periphery of the clutch case and the outer periphery of the hub, the friction plates being arranged alternately with the separator plates; and
a piston that urges the friction plates and the separator plates into contact with each other so as to engage the clutch,
wherein each friction plate has a friction surface formed by attaching a plurality of friction material segments to a first surface of a substantially annular core plate without a gap between adjacent friction material segments,
said friction surface includes a plurality of first oil grooves and a plurality of second oil grooves formed in said friction material segments,
each first oil groove has an opening portion opened at an inner peripheral edge of a corresponding friction material segment and an end portion terminating at a point between the inner peripheral edge and an outer peripheral edge of the corresponding friction material segment,
each second oil groove has an opening portion opened at the outer peripheral edge of the corresponding friction material segment and an end portion terminating at a point between the inner peripheral edge and the outer peripheral edge of the corresponding friction material segment,
each of said friction material segments has at least one of said plurality of first oil grooves and at least one of said plurality of second oil grooves,
said first oil grooves and said second oil grooves are alternately arranged in a circumferential direction equidistantly,
a circumferential width of each first oil groove is the same from the inner peripheral edge of the corresponding friction material segment to the corresponding end portion,
wherein the first oil grooves act to separate the respective friction plate from an adjacent separator plate during idle rotation, and
the second oil grooves act to discharge oil drawn onto the friction surface during idle rotation toward an outer diameter side of the respective friction plate.

16. A wet-type multi-plate clutch according to claim 15, wherein each second oil groove has a width decreasing from said opening portion to said end portion.

17. A wet-type multi-plate clutch according to claim 15, wherein the circumferential width of each first oil groove is greater than a circumferential width of each second oil groove.

18. A wet-type multi-plate clutch according to claim 15, wherein a circumferential width of each second oil groove is the same from the outer peripheral edge of said friction material to the corresponding end portion.

19. A wet-type multi-plate clutch according to claim 18, wherein the circumferential width of each first oil groove is the same as the circumferential width of each second oil groove.

20. A wet-type multi-plate clutch according to claim 15, wherein each second oil groove is arranged in the circumferential direction midway between an adjacent pair of the first oil grooves.

21. A wet-type multi-plate clutch according to claim 15, wherein the hub includes a plurality of oil supply ports, each disposed substantially radially inward from a corresponding one of said friction plates.

22. A wet-type multi-plate clutch according to claim 15, wherein each friction plate has a further friction surface formed by attaching another plurality of said friction material segments to a second surface of the core plate without a gap between adjacent friction material segments on an opposite side of the core plate from the first surface.

* * * * *